United States Patent [19]

Reichelt

[11] Patent Number: 5,121,425
[45] Date of Patent: Jun. 9, 1992

[54] TELEPHONE TRANSMISSION CIRCUIT WITH IMPROVED SWITCHING DEVICE

[75] Inventor: Ingo Reichelt, Schwabach, Fed. Rep. of Germany

[73] Assignee: U.S. Philips Corporation, New York, N.Y.

[21] Appl. No.: 444,595

[22] Filed: Dec. 1, 1989

[30] Foreign Application Priority Data

Dec. 1, 1988 [DE] Fed. Rep. of Germany ....... 3840434

[51] Int. Cl.⁵ .............................................. H04M 1/00
[52] U.S. Cl. .................................. 379/362; 379/359; 379/387
[58] Field of Search ....................... 379/359, 362, 387; 307/254, 311, 570

[56] References Cited

U.S. PATENT DOCUMENTS

| | | | |
|---|---|---|---|
| 4,232,200 | 11/1980 | Hestad et al. | 379/359 |
| 4,306,119 | 12/1981 | Kutzavitch | 379/362 |
| 4,360,744 | 11/1982 | Taylor | 307/254 |
| 4,653,088 | 3/1987 | Budd et al. | 379/165 |
| 4,717,849 | 1/1988 | Shigekane | 307/254 |
| 4,739,199 | 4/1988 | Shigekane | 307/254 |
| 4,800,585 | 1/1989 | Dorland | 379/362 |
| 4,805,214 | 2/1989 | Fensch et al. | 379/399 |
| 4,887,295 | 12/1989 | Jenkins | 379/387 |

FOREIGN PATENT DOCUMENTS

| | | | |
|---|---|---|---|
| 0034843 | 9/1981 | European Pat. Off. | 379/362 |
| 3248355 | 6/1984 | Fed. Rep. of Germany | 379/362 |

*Primary Examiner*—James L. Dwyer
*Assistant Examiner*—Jhancy Augustus
*Attorney, Agent, or Firm*—Bernard Franzblau

[57] ABSTRACT

A circuit arrangement of simple structure for producing dialing pulses for a telephone transmission system so as to provide a relatively low insertion attenuation during transmission. The impedance of the transmission system should not be reduced. At loop closure the a.c. impedance of the circuit is high-ohmic and for d.c. current the circuit has a very low resistance. A switching apparatus is connected to the wires of a connecting line in parallel with the transmission system. The switching apparatus is arranged as a series connection of a bipolar transistor and a switching element consisting of a MOS field-effect transistor.

21 Claims, 2 Drawing Sheets

TELEPHONE TRANSMISSION CIRCUIT WITH IMPROVED SWITCHING DEVICE

BACKGROUND OF THE INVENTION

This invention relates to a circuit arrangement comprising a controller for supplying dialling pulses for transmission means.

In DE-OS 32 48 355 is disclosed a circuit arrangement for supplying dialling pulses through a line connected to a current source in a communication facility, more specifically, a telephone facility. The arrangement comprises a dialling pulse generator controlling, via a controller, a contact mechanism inserted into the line. The switching mechanism thereby causes a change in the current passing through the line with each pulse delivered by the pulse generator. The controller is realised as an optocoupler, whereas the switching device connected in series with the line is a field-effect transistor. By means of a supply circuit a loop is formed between the wires a and b of the transmission line. In addition, from the loop current passing through, the supply circuit derives a supply current which is applied to the remaining circuit portions of the communication facility.

SUMMARY OF THE INVENTION

It is an object of the invention to provide a circuit of the type mentioned in the opening paragraph which has a very simple structure and the least possible input attenuation during transmission, and especially does not in any way reduce the impedance of the transmission means. Thus, when the loop is closed the a.c. impedance of the circuit should be sufficiently high-ohmic. For d.c. current it should have the least possible resistance.

This object is achieved according to the invention in that a switching device is connected in parallel with the transmission means to the wires of a subscriber's line, which device comprises a series connection of a bipolar transistor and a switching element in the form of a MOS field-effect transistor. A constant current source is not used. This is advantageous in that problems can be avoided which may be caused when exchanges supply constant current, which is often the case. When two constant current sources are connected back to back it will usually happen that one of the two sources becomes saturated.

BRIEF DESCRIPTION OF THE DRAWINGS

The invention will be further described and explained with reference to the exemplary embodiments shown in the accompanying drawings, in which.

DESCRIPTION OF THE PREFERRED EMBODIMENTS

Figure 1:
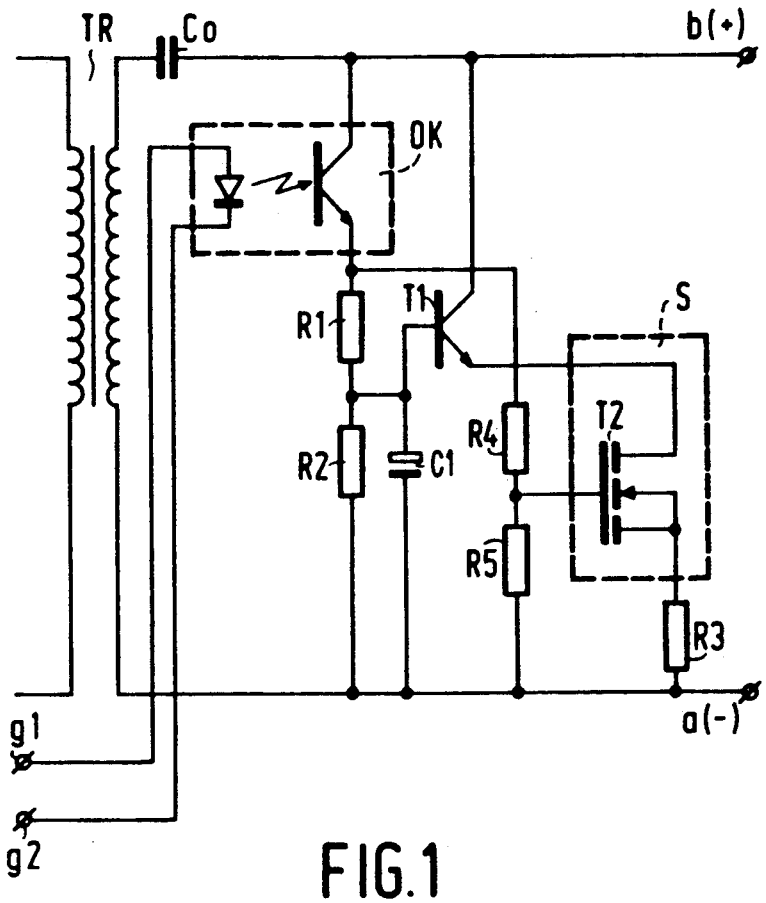
FIG. 1 shows an arrangement comprising a MOS field-effect transistor used as a switching element.

The circuit arrangement shown in FIG. 1 is connected to a communication system, for example, a switching arrangement, through the wires a, b of the connecting line. A bridge rectifier arrangement to be used as a reverse battery protection can be inserted between the circuit arrangement and the communication system connected thereto via the wires a, b of the connecting line. A transformer TR, to whose primary side a transmission means is connected, is connected to the two wires via a capacitor Co. The structure of the transmission means, however, will not be further discussed hereinbelow because it does not form a part of the present invention. For example, it may be a modem for data transmission. A generator of dialling pulses and loop signals is connected to the lines g1 and g2, which generator controls the circuit arrangement via a controller OK. The controller OK preferably comprises an optocoupler consisting of a light-emitting diode and a phototransistor. The phototransistor of the optocoupler has its collector connected to the wire b and its emitter connected to the wire a via the series connection of two resistors R1 and R2. The base of an NPN bipolar transistor T1 is connected to the junction of the two resistors R1 and R2. In addition, a capacitor C1 is inserted between this base and the wire a. The collector of the bipolar transistor T1 is connected to the wire b. A further voltage divider comprising two resistors R4 and R5 is connected in parallel with the voltage divider comprising the two resistors R1 and R2. The gate electrode of a MOS field-effect transistor T2 is connected to the junction of the two resistors R4 and R5. The drain contact point of the MOS field-effect transistor T2 is connected to the emitter of the bipolar transistor T1 and the source connecting point is connected via the resistor R3 to the wire a. The switching element S is only formed by the MOS field-effect transistor T2 in this embodiment.

Once a signal produced by the generator of dialling pulses and loop signals and supplied over the lines g1 and g2 makes the phototransistor conductive by means of the light-emitting diode in the optocoupler OK, the potential of the wire b, which is equal to the potential at the collector of the transistor T1, will be directly applied to the two voltage dividers constituted by the resistors R1 and R2 and R4 and R5, respectively. The gate connecting point of the MOS field-effect transistor is connected to the potential of the wire b through the resistor R4 so that the transistor will switch in the d.c. current mode. It has a very low-ohmic d.c. resistance which is primarily determined by the module. Also, the transistor T1 will simultaneously be rendered conductive through resistor R1, once the capacitor C1 is charged. The base of the transistor T1 is connected Ac to the potential of the wire a via the capacitor C1 so that the base circuit of transistor T1 is energized in the a.c. mode. Through resistor R3 and the very low-ohmic forward resistance of the MOS field-effect transistor, the direct current operating point will be stabilized. The direct current operating point of the circuit is determined by the ratio between the resistors R1, R2 and R3 and the forward resistance of the MOS field-effect transistor. The resistor R3, between the source connection point of the MOS field-effect transistor T2 and the wire a, effects a rise in the dynamic resistance by reducing the reaction of the gate voltage on the emitter current of the bipolar transistor T1.

If the controller OK is controlled by pulses produced by the generator of dialling pulses and loop signals in a manner such that the phototransistor alternately conducts and blocks, the transistor T1 and the MOS field-effect transistor T2, as described hereinbefore, become conductive. The potential at the base of the transistor T1 is contingent on the time constant formed by R2 and C1 so that the transistor T1 continues to be conductive during the pulse series and current will flow directly once the phototransistor again becomes conductive, without the need to charge the capacitor C1 again. If the phototransistor in the optocoupler OK is blocked, the MOS field-effect transistor T2 will also be blocked immediately. This enables the pulses to be transmitted without distortion.

The resistor R5 of the voltage divider at the gate electrode of the MOS field-effect transistor T2, which resistor is connected to the wire a, may be designed to have the lowest possible ohmic level so that a feedback a.c. voltage continues to have no disturbing effect on the gate electrode. Consequently, the further resistor R4 of this voltage divider may be as high-ohmic as possible.

When a call arrives, a continuous signal is applied over the lines g1 and g2 to the optocoupler OK after the loop in the transmission arrangement is closed, e.g. when the handset is lifted, in response to which the bipolar transistor T1 and the field-effect transistor T2 are rendered conductive and assume the function of a closed circuit.

In a preferred embodiment a zener diode (Z-diode) may be substituted for the resistor R5. The Z-diode (zener diode) then has its anode connected to the wire a. This embodiment is advantageous in that it also operates as a protection for the MOS field-effect transistor T2 such that the permissible gate voltage of this transistor is not exceeded.

Figure 2:
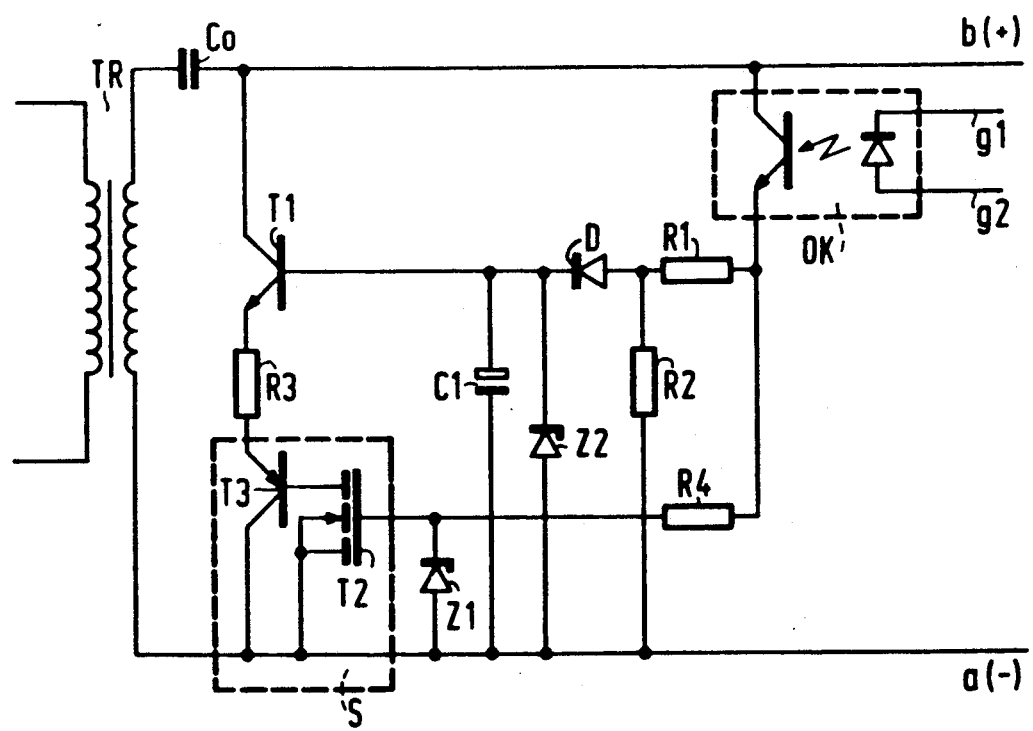
FIG. 2 shows an arrangement comprising a combination of a bipolar transistor and a MOS field-effect transistor used as a switching element.

This preferred arrangement is shown by means of the exemplary embodiment represented in FIG. 2. This exemplary embodiment corresponds in essence with the arrangement shown in FIG. 1 with the exception that the switching element S comprises the combination of a MOS field-effect transistor T2 and a further bipolar transistor T3. In the two Figures the same references have been used for the same components and in order to avoid unnecessary repetition in the following description the function of circuit components already described will not be discussed again.

The emitter-collector path of a further bipolar transistor T3, whose collector is connected to the wire a, is connected in series with the collector-emitter path of the bipolar transistor T1. The drain-source path of the MOS field-effect transistor T2 is connected in parallel with the base-collector path of the further bipolar transistor T3. If the MOS field-effect transistor is switched as a result of a signal from the optocoupler OK, the further bipolar transistor T3 also is simultaneously rendered conductive. The arrangement is advantageously instrumental in a simple and cost-effective manner in avoiding an a.c. current feedback across the MOS field-effect transistor T2 and the resistor R4 to the bipolar transistor T1.

The exemplary embodiment of FIG. 2 shows the series resistor R3 inserted between the collector-emitter path of the bipolar transistor T1 and the emitter-collector path of the further bipolar transistor T3. The resistor R3 in this embodiment also influences the setting of the operating point and the stabilization of the bipolar transistor T1.

In the exemplary embodiment shown in FIG. 2 a further Z-diode Z2 is inserted in parallel with the capacitor C1 connected to the base of the bipolar transistor T1. With this further Z-diode a current-limitation is achieved in an advantageous manner throughout the switching means formed by the bipolar transistor T1 and the switching element connected in series therewith, because the voltage at the base of the bipolar transistor T1 is kept at the value determined by the design of the Z-diode Z2 and thus cannot exceed the permissible value predetermined by this diode.

In a further advantageous embodiment of the invention, a diode D is inserted between the base of the bipolar transistor T1 and the tapping point of the voltage divider comprising the two resistors R1 and R2 in the exemplary embodiment of FIG. 2, which diode prevents the discharge of the capacitor C1 through the resistor R2 during intermittent operation.

Figure 3:
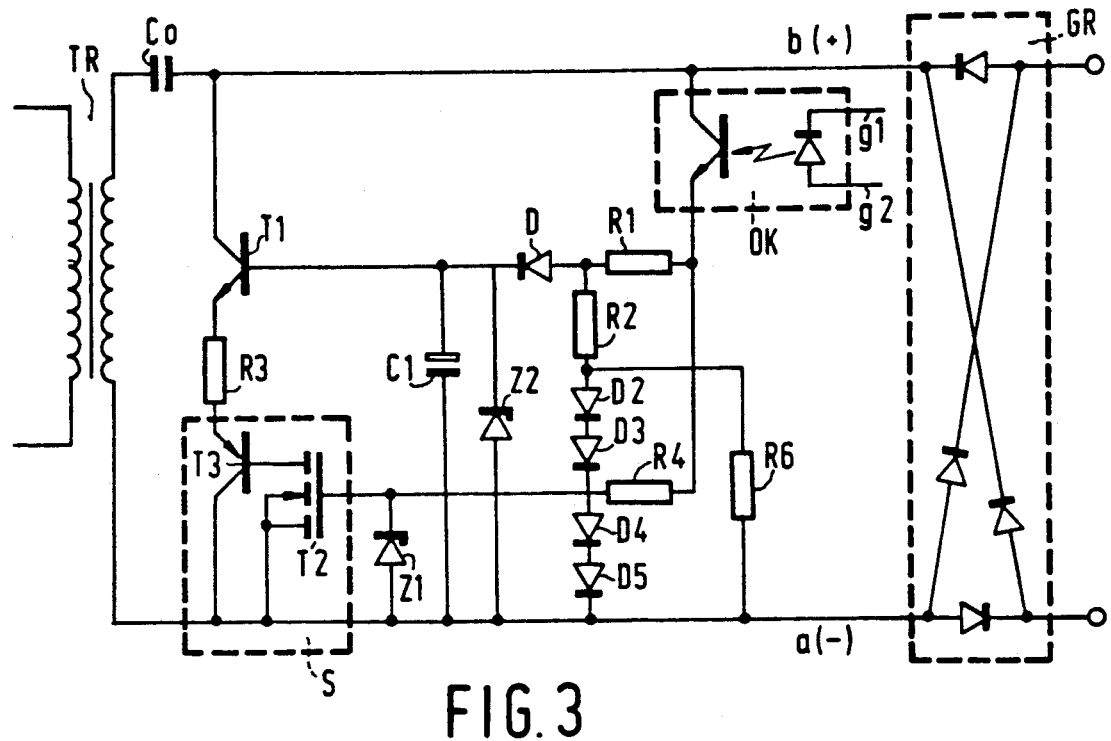
FIG. 3 shows a further arrangement comprising a combination of a bipolar transistor and a MOS field-effect transistor used as a switching element.

The embodiment of the invention shown in FIG. 3 in essence corresponds with the embodiment shown in FIG. 2 and therefore reference is made to the explanation provided above. FIG. 3 shows that a bridge rectifier GR is inserted between the circuit arrangement and the communication system connected thereto via the transmission line constituted by the wires a, b, so that the arrangement has reverse battery protection. A plurality of diodes D2 to D5 is connected in series between the resistor R2 of the voltage divider connected in series with the output circuit of the optocoupler OK and the wire a. In addition, a resistor R6 is connected in parallel with this arrangement comprising the diodes D2 to D5. The circuit arrangement has a d.c. resistance owing to the temperature dependence caused by the current flowing through the semiconductor paths of the transistors and the rectifier in the bridge rectifier, which resistance drops with a rising temperature. This dependence is compensated for by the arrangement represented in FIG. 3 because non-linear circuit elements formed by the diodes in this embodiment are connected in series with the voltage divider comprising the resistors R1 and R2. In this way the d.c. resistance of the arrangement is maintained at a constant level even when the temperature changes. Moreover, irrespective of the current flowing into the terminals, the d.c. resistance of the arrangement will remain constant. The compensating effect of the diode paths can be influenced by means of the resistor R6 connected in parallel with the series connection of the diodes D2 to D5.

Figure 4:
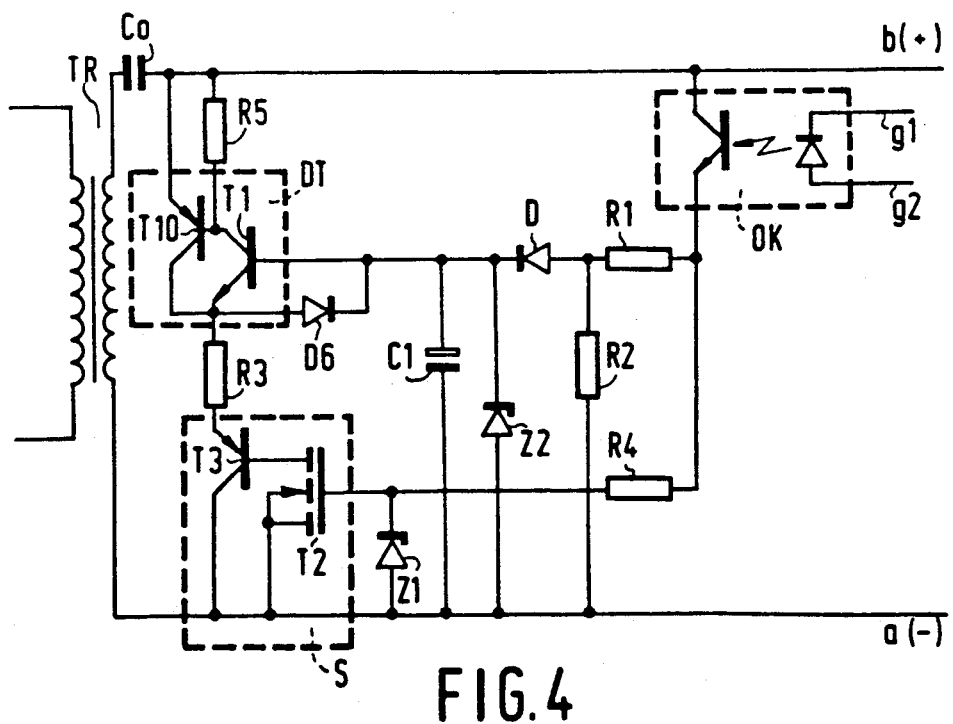
FIG. 4 shows an arrangement in which the bipolar transistor is formed as a Darlington stage.

The embodiment of the invention shown in FIG. 4 in essence corresponds with that shown in FIG. 2, so that reference is made to the explanations provided there. This embodiment is distinguished from that of FIG. 2 in that the bipolar transistor T1 is complemented by a further bipolar transistor T10 connected to form a Darlington stage DT. The current gain attainable with this arrangement, which is higher than when using a single transistor, achieves a smaller load of the control circuit so that the arrangement becomes unilateral. Due to the high current gain of this arrangement the resistor R1 of the voltage divider can be made more high-ohmic when the same amount of current flows through the resistor R3, which narrows down to an increase of the a.c. impedance.

As a result of the different switching behaviour of the transistors in a Darlington stage, the first bipolar transistor T1 may be destroyed when the current through the arrangement is switched off, e.g. by opening the loop, if the further bipolar transistor T10 still remains conductive for a brief period of time after the current has been switched off. This may be caused, for example, by charge stored in the two bipolar transistors. As a result of the current then flowing from the collector of the further bipolar transistor T10, the emitter-base path of the first bipolar transistor T1 is loaded in the non-conducting direction. An improvement is realised by the additional diode D6 because it takes over the current from the collector of the further bipolar transistor T10. By means of the resistor R5 connected between the wire b and the base of the further bipolar transistor T10 of the Darlington stage DT, the influence of a residual current flowing through the bipolar transistor T1 on the Darlington transistor T10 is reduced.

I claim:

1. A circuit arrangement comprising: a controller for producing dialling pulses for a transmission means, a switching device connected in parallel with the transmission means to first and second wires (a, b) of a subscriber's connecting line, wherein the switching device comprises a series connection of a bipolar transistor (T1) and a switching element (S) comprising a MOS field-effect transistor (T2), and wherein the controller includes a further transistor which controls at least the switching of the bipolar transistor.

2. A circuit arrangement as claimed in claim 1, wherein the bipolar transistor includes a base and is operated in the a.c. mode in common base configuration and with a capacitor connected between the base of the bipolar transistor and the first wire (a).

3. A circuit arrangement as claimed in claim 2, further comprising a zener diode connected in parallel with the capacitor.

4. A circuit arrangement as claimed in claim 2, wherein the drain-source path of the switching element (S) comprising said MOS field-effect transistor is connected in series with the emitter-collector path of the bipolar transistor.

5. A circuit arrangement as claimed in claim 2, wherein the switching element (S) comprises the emitter-collector path of a further bipolar transistor (T3) and with said MOS field-effect transistor connected in parallel with the base-collector path of said further bipolar transistor.

6. A circuit arrangement as claimed in claim 2, further comprising a resistor coupled in series with the switching device.

7. A circuit arrangement as claimed in claim 1, further comprising a resistor coupled in series with the switching device.

8. A circuit arrangement as claimed in claim 7, wherein the resistor is coupled between the bipolar transistor and the switching element.

9. A circuit arrangement as claimed in claim 7, further comprising a diode connected in a control line of the bipolar transistor.

10. A circuit arrangement as claimed in claim 7, wherein a control line for the bipolar transistor is connected to a tapping point of a voltage divider comprising two resistors (R1, R2) coupled to an output circuit of an optocoupler, and means connecting a plurality of non-linear circuit elements in series with the voltage divider.

11. A circuit arrangement as claimed in claim 1, wherein a control line for the bipolar transistor is connected to a tapping point of a voltage divider comprising two resistors (R1, R2) coupled in the output circuit of an optocoupler, and means connecting a plurality of non-linear circuit elements in series with the voltage divider.

12. Circuit arrangement as claimed in claim 11, wherein the non-linear circuit elements are diodes.

13. A circuit arrangement as claimed in claim 1, wherein the drain-source path of the switching element (S) comprising said MOS field-effect transistor is connected in series with the emitter-collector path of the bipolar transistor.

14. A circuit arrangement as claimed in claim 1, further comprising a diode connected in a control line of the bipolar transistor.

15. A circuit arrangement as claimed in claim 1, further comprising a resistor connected between a gate connection of the MOS field-effect transistor and the first wire (a) of the connecting line.

16. A circuit arrangement as claimed in claim 1 further comprising, a zener diode connected between a gate connection of the MOS field-effect transistor and the first wire (a) of the connecting line.

17. A circuit arrangement as claimed in claim 1, wherein the bipolar transistor is coupled to a further bipolar transistor so as to form a Darlington stage, and means connecting a diode between the emitter and the base of the bipolar transistor.

18. A circuit arrangement as claimed in claim 1 further comprising a capacitor connected between the base of the bipolar transistor and the first wire and a resistor connected between a gate connection of the MOS field-effect transistor and the first wire of the connecting line.

19. A circuit arrangement as claimed in claim 1 further comprising a capacitor connected between the base of the bipolar transistor and the first wire, and a zener diode connected in parallel with the capacitor.

20. A circuit arrangement comprising: a controller for producing dialling pulses for a transmission means, a switching device connected in parallel with the transmission means to first and second wires (a, b) of a subscriber's line, wherein the switching device comprises a series connection of the emitter-collector path of a bipolar transistor (T1) and a switching element (S) comprising the emitter-collector path of a further bipolar transistor (T3), and with an MOS field-effect transistor connected in parallel with the base-collector path of said further bipolar transistor.

21. A telephone circuit comprising:
    first and second conductors for connecting to a subscriber's connecting line,
    a transmission circuit a.c. coupled to said first and second conductors,
    a controller for producing dialing pulses for the transmission circuit, said controller being operative without a current source,
    a switching device connected to said first and second conductors, said switching device comprising a series circuit including a bipolar transistor and a MOS field effect transistor, and
    means coupling an output of said controller to said switching device to control the switching thereof as a function of the dialing pulses produced by the controller.

* * * * *